Patented Nov. 12, 1935

2,020,918

UNITED STATES PATENT OFFICE 2,020,918

ZINC SULPHIDE

George F. A. Stutz and Arne J. Myhren, Palmerton, Pa., assignors to The New Jersey Zinc Company, New York, N. Y., a corporation of New Jersey No Drawing. Application May 19, 1931,
Serial No. 538,610

6 Claims. (Cl. 134—78)

This invention relates to zinc sulphide, and has for its object the provision of certain improvements in the precipitation of zinc sulphide by the treatment of an aqueous solution of a zinc salt with hydrogen sulphide. The invention is especially concerned with the production of pigment zinc sulphide of high quality by a process of improved technique and economic efficiency.

The invention is particularly applicable to the production of pigment zinc sulphide from aqueous solutions of zinc sulphate resulting from the treatment of zinc sulphide material in accordance with the procedure disclosed in our copending U. S. Patent application, Serial No. 538,609 filed May 19, 1931. In general, however, the invention is applicable to the production of pigment zinc sulphide from purified aqueous solutions of zinc sulphate or other appropriate water-soluble zinc salt, resulting from any treatment process. In its broad aspect the invention involves subjecting an aqueous solution of the zinc salt of appropriate dilution to intimate contact with hydrogen sulphide gas. Preferably the precipitation is conducted so that the liquid and the gas are in counter-current flow, that is, the zinc sulphate entering the precipitating apparatus first comes in contact with gas from which most of the hydrogen sulphide has been removed. Likewise the strong hydrogen sulphide gas entering the apparatus first comes in contact with liquor in which most of the zinc sulphate has been converted into zinc sulphide. Thus, in the body of liquor or slurry undergoing precipitation there is a progressively decreasing concentration of the zinc sulphate and a progressively increasing concentration of hydrogen sulphide. The precipitation is carried out so as to produce an ultimate particle size of the precipitated zinc sulphide suitable for pigment purposes. This control of the particle size is effected by an appropriate ageing treatment under conditions of time and temperature hereinafter more particularly described. The end point of the precipitating operation is controlled to impart a desired degree of alkalinity to the zinc sulphide for pigment purposes. These and other features of the invention will more fully appear from the following description.

The purified aqueous solution of zinc sulphate (or other suitable water soluble zinc salt) is diluted with water (if necessary) to an appropriate degree to avoid undue re-solution of the precipitated zinc sulphide in the sulphuric acid resulting from the precipitating reaction and to establish an appropriate solid-liquid ratio in the precipitated slurry. The water used for dilution should be purified, if necessary, to remove such soluble compounds as deleteriously affect the precipitation, as for example, by contamination of the precipitate with undesirable impurities. We have found a zinc sulphate solution of 10 Bé. (that is, one containing 0.26 pounds of zinc per gallon) admirably adapted for the purposes of the invention. The diluted solution of zinc sulphate is brought into intimate contact with hydrogen sulphide gas in any appropriate manner whereupon the sulphide is precipitated in accordance with the following chemical reaction:

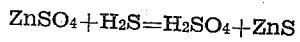

$$ZnSO_4 + H_2S = H_2SO_4 + ZnS$$

Various forms of apparatus may be utilized in bringing about the desired intimate contact of the zinc sulphate solution and hydrogen sulphide gas. Thus, the zinc sulphate solution may be introduced at the top of an absorption tower through which hydrogen sulphide gas ascends. Preferably, this ascending hydrogen sulphide gas, coming in contact with fresh zinc sulphate solution, is the unconsumed remainder from a second or later stage of the precipitation. The zinc sulphate solution may be either sprayed into the top of the absorption tower continuously or it may be automatically fed in batches (for example, a predetermined batch each minute), care being taken to distribute the solution uniformly over the cross-section of the tower. The descent of the liquor through the tower is retarded and dispersed so as to produce effective contact with the ascending gas by any appropriate means, such, for example, as wooden grids, checker work, etc. As the zinc sulphate solution descends through the tower in intimate contact with the ascending current of hydrogen sulphide gas zinc sulphide is precipitated and carried down to the bottom of the tower by the liquor.

The precipitated zinc sulphide may be removed from the liquor or may remain in suspension in the liquor during the following second stage treatment in the course of which the partly spent liquor is brought into contact for a prolonged period with fresh hydrogen sulphide gas, as for example in a stirring device of the impeller type to which the hydrogen sulphide gas is fed by pressure, or which is operated at such high speed as to drag the hydrogen sulphide gas down into the liquor by suction.

The required intimate contact between the zinc sulphate solution and the hydrogen sulphide gas may be brought about in a series of consecutive and communicating compartments or cells in each of which the liquor is recirculated so as to discharge back into the compartment or cell through an eductor which sucks the hydrogen sulphide gas from above the liquor level back into the liquor. Preferably the precipitation is conducted so that the liquid and the gas are in counter-current flow, that is, the zinc sulphate entering the first of the series of compartments or cells first comes in contact with gas from which most of the hydrogen sulphide has been removed. Likewise the strong gas entering the last of the series of compartments or cells first comes in contact with liquor or slurry in which most of the zinc sulphate has been converted into zinc sulphide. Various other forms of apparatus may, of course, be employed for effecting the desired intimate contact of the zinc sulphate solution and hydrogen sulphide gas during the precipitation operation.

When the zinc in the liquor has been substantially precipitated as zinc sulphide, the resulting suspension of zinc sulphide in dilute sulphuric acid (e. g. 43 to 50 grams zinc sulphide per liter) is discharged into a thickener, or equivalent device, where the precipitate is settled and excess liquor removed. The precipitate increases in particle size by ageing in the thickener to such a degree that it can be more readily filtered and that the finished product has improved hiding power. The time of ageing required is a function of the temperature at which the precipitation is carried out, the temperature at which the ageing is carried out and the acid concentration of the liquor or slurry in which ageing is carried out. It is our preferred practice to carry out the precipitation at a temperature of about 60° C. Where the temperature of the liquor during precipitation is maintained at about 60° C., an ageing treatment of about 18 hours in the thickener or equivalent apparatus at resulting temperatures and acid concentrations gives very satisfactory results. While the combination of hot precipitation (60° C.) and several hours ageing at resulting temperatures and at resulting acid concentrations gives very satisfactory results, the precipitation may be carried out cold provided a longer period of ageing is used. The advantage of hot precipitation, either with or without the ageing treatment, is the obtaining of a product of easier handling characteristics (since the resulting coarser particles can be more readily filtered) and of better pigment characteristics.

After discharge from the thickener, the precipitate is filtered and washed, as for example, on a rotary filter. The filter cake is then repulped with water, that has been purified if necessary, and the resulting pulp transferred to neutralizing tanks. The resulting pulp or slurry is treated with an appropriate alkaline substance in the neutralizing tanks to neutralize the remnants of sulphuric acid therein, and to render the zinc sulphide precipitate alkaline and hard enough (after appropriate drying) for calcination. Barium hydroxide, calcium hydroxide and barium sulphide are suitable alkaline substances for neutralizing. Barium hydroxide is preferred. Both barium hydroxide and calcium hydroxide aid flocculation and consequently settling, but calcium hydroxide has a deleterious effect on the color in some cases, on account of the contaminants it contains. Barium sulphide is satisfactory when only a small amount thereof need be added to bring about neutralization. Barium sulphide disocciates into barium sulphhydrate $(Ba(SH)_2)$ and barium hydroxide $(Ba(OH)_2)$ when dissolved in water. The SH ion from the barium sulphhydrate has a tendency to render the pulp acid if too much barium sulphide is added. The use of alkalies with a less readily adsorbed positive ion (such as sodium hydroxide or ammonium hydroxide) may in some cases, be disadvantageous since a less readily adsorbed positive ion in this type of slurry may, under certain conditions, produce dispersion and cause difficulties in settling and filtration.

Where barium hydroxide or barium sulphide is used for neutralizing, the sulphuric acid adhering to the pulp is transformed to barium sulphate, which precipitates. Where calcium sulphate, which precipitates. Where calcium hydroxide is used for neutralizing, a precipitate of calcium sulphate is formed. The small amount of the substances thus formed have no deleterious effect on the ultimate pigment product. The zinc sulphide content of the pigment may vary; 93% ZnS being quite satisfactory.

If barium sulphide is used for neutralization, the end point of neutralization is preferably determined by separate titration of the OH and SH ions in accordance with the procedure prescribed in the U. S. Patents of W. C. Hooey Nos. 1,759,115 and 1,759,116. Thus, for example, barium sulphide may be added till 250 cc. of the filtrate from the crude pulp consume 6.5 cc. of 0.25 N hydrochloric acid when titrated with phenolthalein as indicator (OH analysis) and 25 cc. of the filtrate from the crude pulp consume 2 cc. of 0.1 N iodine solution (iodine dissolved in an aqueous solution of potassium iodide) on titration (SH analysis). The pulp thus obtained will yield a pigment with an adequate degree of alkalinity.

Any other suitable procedure of finishing the pigment product may, of course, be employed. Whatever the finishing practice, there is produced a zinc sulphide product, containing usually 93% or more ZnS, possessing very satisfactory pigment properties.

We claim:

1. In the manufacture of zinc sulphide pigment, the improvements which comprise introducing bubbles of hydrogen sulphide gas into a body of mixed zinc sulphate and sulphuric acid solution, to form a slurry of zinc sulphide precipitate, the mixed zinc sulphate and sulphuric acid liquor moving countercurrently to the bubbles of hydrogen sulphide gas so that the zinc sulphate solution may be brought in intimate contact with hydrogen sulphide gas of progressively increasing concentration, aging the zinc sulphide precipitate in the resulting impoverished solution, and removing said precipitate from said solution.

2. A method of manufacturing zinc sulphide pigment according to claim 1, in which the diluted and unreacted hydrogen sulphide gas remaining is countercurrently brought into intimate contact with a shower of concentrated zinc sulphate solution to form a slurry of zinc sulphide precipitate and sulphuric acid together with some unconverted zinc sulphate solution, collecting the unconverted zinc sulphate solution admixed with the sulphuric acid, and then treating this unconverted zinc sulphate solution according to the method of claim 1.

3. In the manufacture of zinc sulphide pigment by bringing together zinc sulphate solution and hydrogen sulphide gas, the improvements which comprise first bringing concentrated zinc sulphate solution in the form of a descending shower into contact with ascending diluted hydrogen sulphide gas to form a slurry of zinc sulphide precipitate and sulphuric acid together with unconverted zinc sulphate solution, collecting the unconverted zinc sulphate solution admixed with the sulphuric acid, and then subjecting the thus diluted zinc sulphate solution in the form of an aqueous body to treatment with concentrated hydrogen sulphide gas in the form of submerged bubbles for a prolonged period to precipitate a further amount of zinc sulphide, the unconsumed diluted hydrogen sulphide gas escaping from said body of diluted zinc sulphate solution being the said diluted hydrogen sulphide gas made to ascend in contact with said shower of concentrated zinc sulphate solution.

4. In the manufacture of zinc sulphide pigment by bringing together zinc sulphate solution and hydrogen sulphide gas, the improvements which comprise first bringing concentrated zinc sulphate solution into contact with diluted hydrogen sulphide gas to form a slurry of zinc sulphide precipitate and sulphuric acid together with unconverted zinc sulphate solution, separating the zinc sulphide precipitate at least in part from the slurry, and then subjecting the thus diluted zinc sulphate solution and sulphuric acid to treatment with concentrated hydrogen sulphide gas to precipitate a further amount of zinc sulphide.

5. In the manufacture of zinc sulphide pigment by bringing together zinc sulphate solution and hydrogen sulphide gas the improvements which comprise first spraying concentrated zinc sulphate solution counter-currently through diluted hydrogen sulphide gas to form a slurry of zinc sulphide precipitate and sulphuric acid together with unconverted zinc sulphate solution, collecting the resulting sulphuric acid and unconverted zinc sulphate solution, then introducing concentrated hydrogen sulphide gas into said sulphuric acid and unconverted zinc sulphate solution to precipitate a further amount of zinc sulphide, aging the resulting precipitate of zinc sulphide in the resulting impoverished solution, and removing said precipitate from said solution.

6. In a process for making pigment zinc sulphide the improvement which comprises dispersing relatively strong zinc sulphate solution in relatively dilute hydrogen sulphide gas to form a mixture containing zinc hulphide particles, sulphuric acid and residual zinc sulphate solution, collecting this mixture in the form of a slurry, dispersing relatively strong hydrogen sulphide gas in the slurry, withdrawing the resultant dilute hydrogen sulphide gas from the slurry, bringing said dilute hydrogen sulphide gas into contact with the dispersed relatively strong zinc sulphate solution, aging the slurry following its treatment with the relatively strong hydrogen sulphide gas to enlarge the zinc sulphide particles in the slurry, and removing the zinc sulphide particles thus enlarged from the slurry.

GEORGE F. A. STUTZ.
ARNE J. MYHREN.